Figure 1:
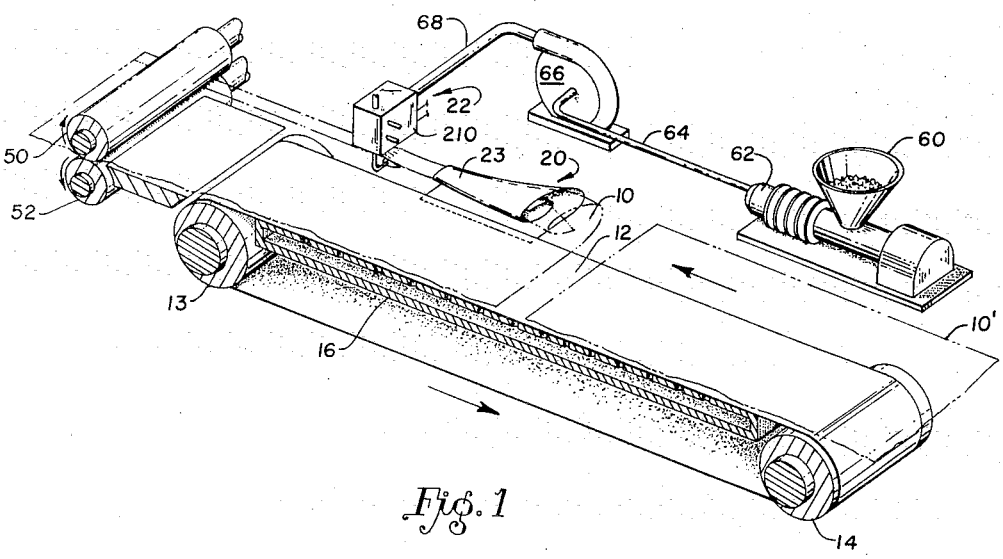
Figure 2:
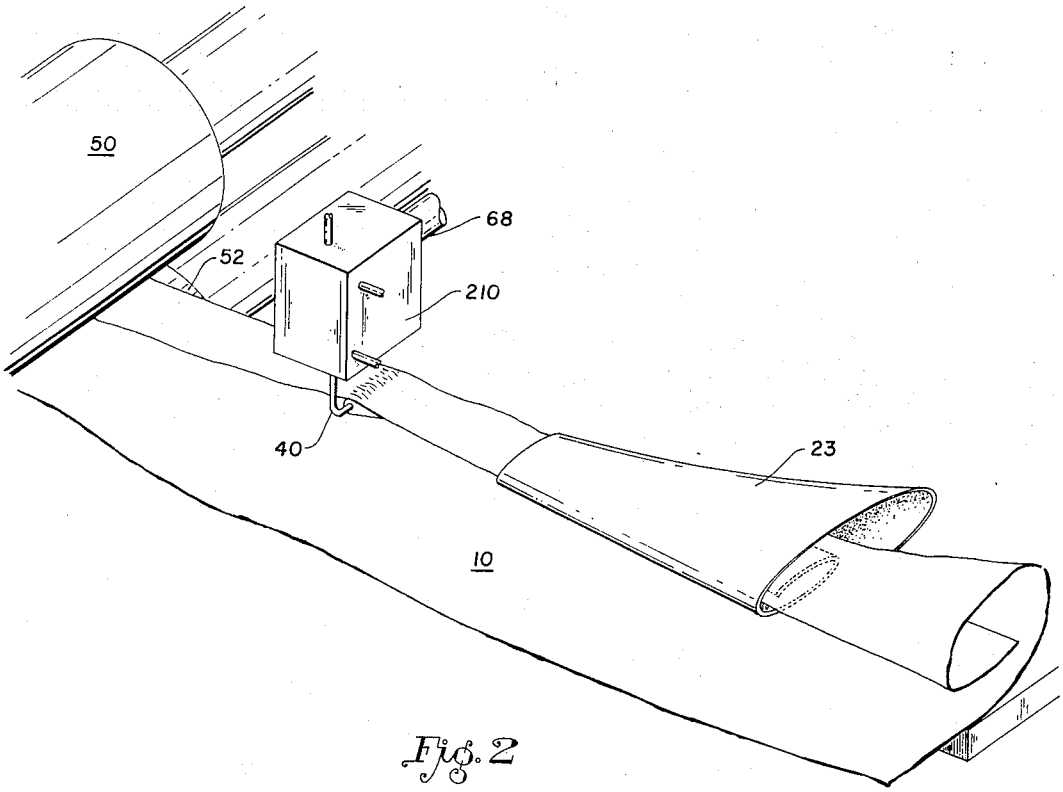
Figure 3:
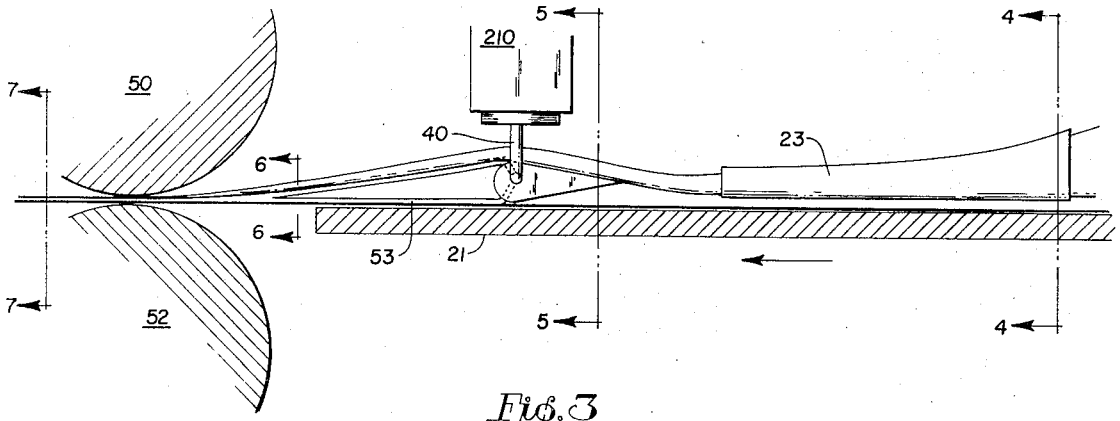
Figure 5:
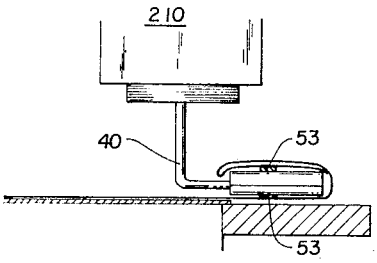
Figure 4:
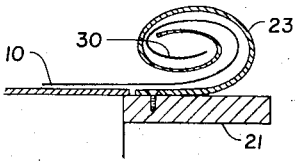
Figure 6:
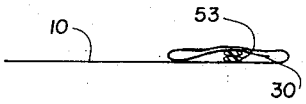
Figure 8:
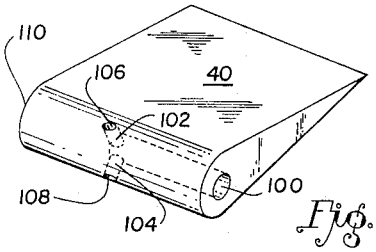
Figure 7:
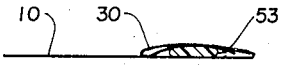

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 3, 1974

926 O.G. 10

T926,006

APPARATUS AND METHOD FOR SEAMING MATERIAL WITH HOT MELT ADHESIVE

Larry B. Newman, Rte. 14, 5745 Chestnut Hill, Kingsport, Tenn. 37664

Filed Aug. 20, 1973, Ser. No. 389,754

Int. Cl. B32b 7/14

U.S. Cl. 156—291

2 Sheets Drawing. 12 Pages Specification

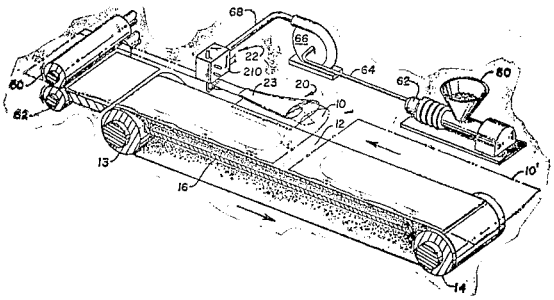

An apparatus and method for bonding plies of sheet material, especially fabric material, using a hot melt adhesive applied from a dual-opening nozzle are disclosed. An in-line sequence of operations includes bringing a ply of sheet material into overlying, aligned position with another ply, applying hot melt adhesive simultaneously to each of the plies immediately as it is extruded, and finally pressing the plies together prior to solidification of the adhesive.